(12) United States Patent
Yamakawa et al.

(10) Patent No.: US 7,792,259 B2
(45) Date of Patent: Sep. 7, 2010

(54) COLLECTIVE HOUSING INTERCOM SYSTEM

(75) Inventors: Seiya Yamakawa, Nagoya (JP); Yoshiyuki Hirahata, Nagoya (JP)

(73) Assignee: Aiphone Co., Ltd. (JP)

(*) Notice: Subject to any disclaimer, the term of this patent is extended or adjusted under 35 U.S.C. 154(b) by 1057 days.

(21) Appl. No.: 11/504,734

(22) Filed: Aug. 16, 2006

(65) Prior Publication Data
US 2007/0189483 A1 Aug. 16, 2007

(30) Foreign Application Priority Data
Jan. 31, 2006 (JP) ............... 2006-023641

(51) Int. Cl.
*H04M 1/60* (2006.01)
*H04M 9/00* (2006.01)

(52) U.S. Cl. .................. 379/167.02; 379/167.04; 379/167.12

(58) Field of Classification Search ............ 379/167.01, 379/167.02, 167.04, 167.14, 167.12; 348/14.01, 348/14.08, 156
See application file for complete search history.

(56) References Cited

U.S. PATENT DOCUMENTS

| | | | | |
|---|---|---|---|---|
| 4,961,177 A * | 10/1990 | Uehara | .................. | 704/272 |
| 5,612,994 A * | 3/1997 | Chen | .................. | 379/167.12 |
| 5,754,637 A * | 5/1998 | Choi | .................. | 379/167.11 |
| 7,046,774 B2 * | 5/2006 | Yoshida et al. | ......... | 379/102.06 |
| 7,353,042 B2 * | 4/2008 | Yamagishi | .................. | 455/556.1 |
| 2003/0223561 A1 * | 12/2003 | Yoshida et al. | ......... | 379/167.01 |
| 2005/0281402 A1 * | 12/2005 | Petrank | .................. | 379/167.04 |
| 2007/0146477 A1 * | 6/2007 | Lee | .................. | 348/14.01 |
| 2008/0007621 A1 * | 1/2008 | Ying et al. | .................. | 348/156 |

FOREIGN PATENT DOCUMENTS

| | | |
|---|---|---|
| JP | 2000-224315 | 11/2000 |
| JP | 2001-061139 | 6/2001 |

OTHER PUBLICATIONS

Aiphone Co., Ltd.; General Catalogue, 2005/2006 Edition; pp. 145 and 148 to 151.

* cited by examiner

*Primary Examiner*—Binh K Tieu
(74) *Attorney, Agent, or Firm*—Bacon & Thomas, PLLC

(57) ABSTRACT

Irrespective of the distance of a line through which a video signal is taken by the camera of a main entrance station, a satisfactory image having not deterioration but excellent visibility is displayed in a monitor of a residential master station. A distance decision unit of a residential master station for displaying a video signal taken by a camera of an main entrance station in a monitor decides the distance of the line length of a master station line in terms of the voltage drop of the DC power supply fed from a controller to the residential master station. A level compensation unit of the residential master station compensates the level of the video signal in accordance with the decided distance. A distance decision unit of the main entrance station decides the distance of the line length of an entrance line in terms of the voltage drop of the DC power supply fed from the controller to the main entrance station. A level compensation unit of the main entrance station compensates the level of the video signal in accordance with the decided distance.

6 Claims, 5 Drawing Sheets

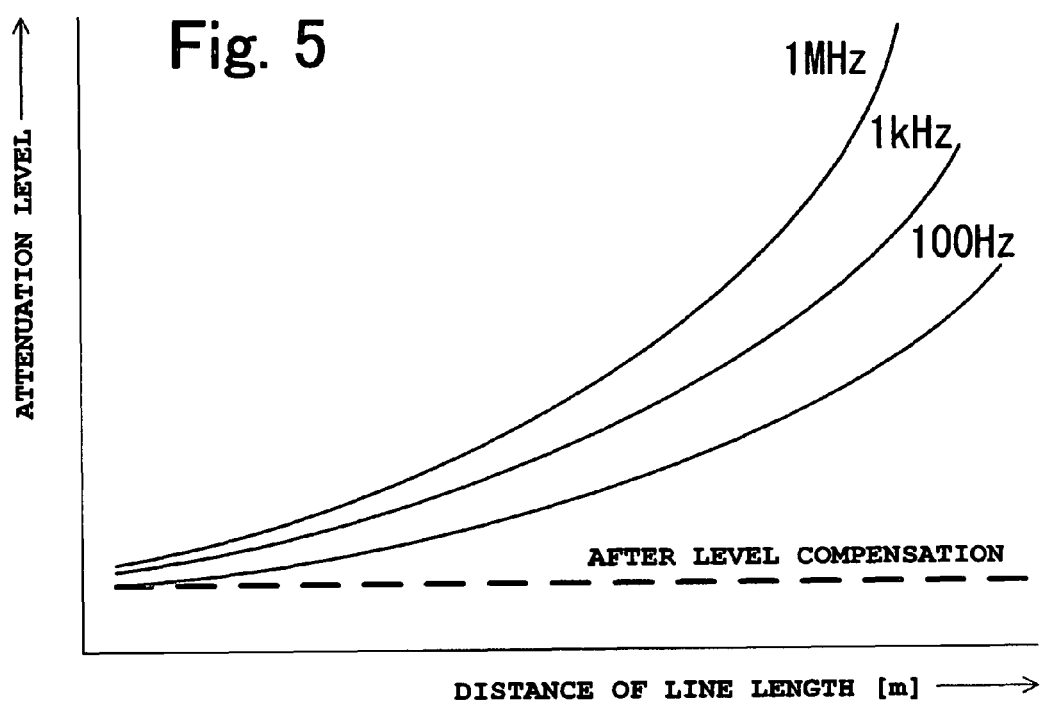

COLLECTIVE HOUSING INTERCOM SYSTEM

BACKGROUND OF THE INVENTION (1) Field of the Invention

The present invention relates to a collective housing intercom system for a collective housing such as an apartment house and, more particularly, to a collective housing intercom system having a technique for compensating the level of a video signal taken by the camera of a main entrance station.

(2) Description of Related Art

In the prior art, the collective housing intercom system of this kind is exemplified by that (as referred to Non-Patent Document 1) which can display the image (or the video signal) taken by the camera of a main entrance station in the monitor of a predetermined residential master station (or a calling partner).

Non-Patent Document 1: General Catalogue 2005/2006 Edition (pages 145, and 148 to 151), issued by Aiphone Co., Ltd.

According to the collective housing intercom system of Non-Patent Document 1 described above, however, the video signal taken by the camera of the main entrance station is transmitted in a base band to a specific residential master station so that the level attenuates according to the distance of the line length of the line through which the video signal is transmitted. As a result, the image taken by the camera of the main entrance station may be displayed as a deteriorated image of poor visibility in the monitor of the residential master station.

The present invention has been conceived to solve the problem described hereinbefore, and has an object to provide a collective housing intercom system capable of displaying a satisfactory image having not deterioration but excellent visibility in the monitor of a residential master station, irrespective of the long distance of a line through which the video signal is taken by the camera of the main entrance station.

BRIEF SUMMARY OF THE INVENTION

In order to achieve the aforementioned object, according to a first aspect of the invention, there is provided a collective housing intercom system comprising: main entrance station having a camera disposed at the entrance of a collective housing; residential master stations disposed in the individual residences of the collective housing and having monitors for displaying the image taken by the camera of the main entrance station; and a controller for controlling the main entrance station connected through an entrance line and the residential master stations connected through master station lines. Each of the residential master stations includes a distance decision unit for deciding the voltage drop of a DC power supply fed from the controller to decide the distance of the line length of the master station lines, and a level compensation unit for compensating the level of a video signal transmitted from the main entrance station, in accordance with the distance decided by the distance decision unit.

According to a second aspect of the invention, moreover, there is provided a collective housing intercom system comprising: main entrance station having a camera disposed at the entrance of a collective housing; residential master stations disposed in the individual residences of the collective housing and having monitors for displaying the image taken by the camera of the main entrance station; and a controller for controlling the main entrance station connected through an entrance line and the residential master stations connected through master station lines. The main entrance station includes a distance decision unit for deciding the voltage drop of a DC power supply fed from the controller to decide the distance of the line length of the entrance line, and a level compensation unit for compensating the level of a video signal taken by the camera, in accordance with the distance decided by the distance decision unit.

According to a third aspect of the invention, moreover, there is provided a collective housing intercom system comprising: main entrance station having a camera disposed at the entrance of a collective housing; residential master stations disposed in the individual residences of the collective housing and having monitors for displaying the image taken by the camera of the main entrance station; and a controller for controlling the main entrance station connected through an entrance line and the residential master stations connected through master station lines. Each of the residential master stations includes a distance decision unit for detecting the voltage drop of the DC component of a video signal transmitted in a base band from the main entrance station to decide the total distance of the line lengths of the entrance line and the master station lines, and a level compensation unit for compensating the level of the video signal, in accordance with the distance decided by the distance decision unit.

According to a fourth aspect of the invention, moreover, there is provided a collective housing intercom system comprising: main entrance station having a camera disposed at the entrance of a collective housing; residential master stations disposed in the individual residences of the collective housing and having monitors for displaying the image taken by the camera of the main entrance station; and a controller for controlling the main entrance station connected through an entrance line and the residential master stations connected through master station lines. The controller includes a distance decision unit for detecting the voltage drop of the DC component of a video signal transmitted in a base band from the main entrance station to decide the distance of the line length of the entrance line, and a level compensation unit for compensating the level of the video signal, in accordance with the distance decided by the distance decision unit.

According to a fifth aspect of the invention, moreover, there is provided a collective housing intercom system comprising: main entrance station having a camera disposed at the entrance of a collective housing; residential master stations disposed in the individual residences of the collective housing and having monitors for displaying the image taken by the camera of the main entrance station; and a controller for controlling the main entrance station connected through an entrance line and the residential master stations connected through master station lines. The controller includes a distance decision unit for detecting the current flow of the DC power supply to be fed to the main entrance station to decide the distance of the line length of the entrance line, and a level compensation unit for compensating the level of the video signal transmitted from the main entrance station, in accordance with the distance decided by the distance decision unit.

According to a sixth aspect of the invention, moreover, there is provided a collective housing intercom system comprising: main entrance station having a camera disposed at the entrance of a collective housing; residential master stations disposed in the individual residences of the collective housing and having monitors for displaying the image taken by the camera of the main entrance station; and a controller for controlling the main entrance station connected through an entrance line and the residential master stations connected through master station lines. The controller includes a distance decision unit for detecting the current flow of the DC power supply to be fed to the residential master station to decide the distance of the line length of the master station line, and a level compensation unit for compensating the level of the video signal transmitted from the main entrance station, in accordance with the distance decided by the distance decision unit.

According to the first aspect of the collective housing intercom system of the invention, the distance decision unit of the residential master station for displaying the video signal taken by the camera of the main entrance station in a monitor decides the distance of the line length of the master station line in terms of the voltage drop of the DC power supply fed from the controller to the residential master station, so that the level compensation unit of the residential master station can compensate the level of the video signal in accordance with the decided distance. As a result, the video signal taken by the camera of the main entrance station can be displayed as the satisfactory image having not deterioration but excellent visibility in the monitor of the residential master station irrespective of the distance of the line length of the master station line.

According to the second aspect of the collective housing intercom system of the invention, the distance decision unit of the main entrance station having a camera for taking a video signal decides the distance of the line length of the entrance line in terms of the voltage drop of the DC power supply fed from the controller to the main entrance station, so that the level compensation unit of the main entrance station can compensate the level of the video signal in accordance with the decided distance. As a result, the video signal taken by the camera of the main entrance station can be displayed as the satisfactory image having not deterioration but excellent visibility in the monitor of the residential master station irrespective of the distance of the line length of the entrance line.

According to the third aspect of the collective housing intercom system of the invention, the distance decision unit of the residential master station for displaying the video signal taken by the camera of the main entrance station in the monitor decides the total distance of the line lengths of the entrance line and the master station line in terms of the voltage drop of the DC component of the video signal transmitted in the base band from the main entrance station, so that the level compensation unit of the residential master station can compensate the level of the video signal in accordance with the decided distance. As a result, the video signal taken by the camera of the main entrance station can be displayed as the satisfactory image having not deterioration but excellent visibility in the monitor of the residential master station irrespective of the distances of the individual line lengths of the entrance line and the master station line.

According to the fourth aspect of the collective housing intercom system of the invention, when the video signal taken by the camera of the main entrance station is displayed in the monitor of a residential master station, the distance decision unit of a controller for controlling the main entrance station and the residential master station decides the distance of the line length of the entrance line in terms of the voltage drop of the DC component of the video signal transmitted in the base band from the main entrance station, so that the level compensation unit of the controller can compensate the level of the video signal in accordance with the decided distance. As a result, the video signal taken by the camera of the main entrance station can be displayed as the satisfactory image having not deterioration but excellent visibility in the monitor of the residential master station irrespective of the distance of the line length of the entrance line.

According to the fifth aspect of the collective housing intercom system of the invention, when the video signal taken by the camera of the main entrance station is displayed in the monitor of a residential master station, the distance decision unit of a controller for controlling the main entrance station and the residential master station detects the current flow of the DC power supply fed from the controller to the main entrance station and decides the distance of the line length of the entrance line, so that the level compensation unit of the controller can compensate the level of the video signal in accordance with the decided distance. As a result, the video signal taken by the camera of the main entrance station can be displayed as the satisfactory image having not deterioration but excellent visibility in the monitor of the residential master station irrespective of the distance of the line length of the entrance line.

According to the sixth aspect of the collective housing intercom system of the invention, when the video signal taken by the camera of the main entrance station is displayed in the monitor of a residential master station, the distance decision unit of a controller for controlling the main entrance station and the residential master station detects the current flow of the DC power supply fed from the controller to the residential master station and decides the distance of the line length of the master station line, so that the level compensation unit of the controller can compensate the level of the video signal in accordance with the decided distance. As a result, the video signal taken by the camera of the main entrance station can be displayed as the satisfactory image having not deterioration but excellent visibility in the monitor of the residential master station irrespective of the distance of the line length of the master station line.

BRIEF DESCRIPTION OF THE SEVERAL VIEWS OF THE DRAWINGS

FIG. 5 is a characteristic diagram for explaining the level compensation of video signals to be applied to the intercom systems in the individual first to fourth embodiments of the invention.

DETAILED DESCRIPTION OF THE INVENTION

The best mode of embodiment, to which the collective housing intercom system of the invention is applied, is described with reference to the accompanying drawings.

Figure 1:
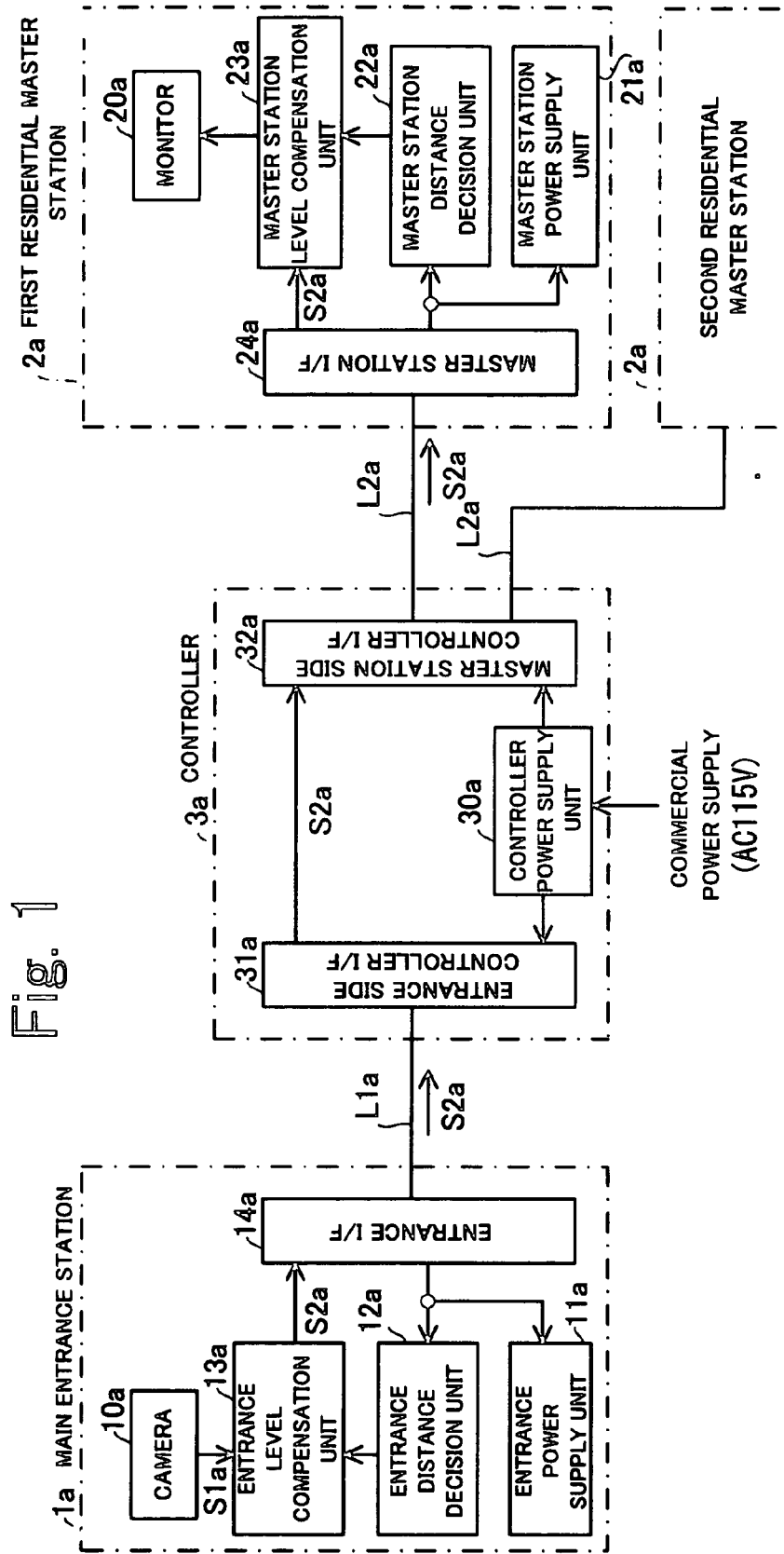
FIG. 1 is a block diagram showing a specific configuration of a collective housing intercom system according to a first embodiment of the invention.

FIG. 1 is a block diagram showing a specific configuration of the collective housing intercom system according to the first embodiment of the invention.

The collective housing intercom system shown in FIG. 1 is provided with: a main entrance station 1a disposed at the entrance of a collective housing such as an apartment house; a plurality of residential master stations individually disposed in the houses of the collective housing, such as first, second . . . residential master stations 2a, 2a, . . . ; and a controller 3a for controlling the main entrance station 1a connected through an entrance line L1a and the first, second . . . residential master stations 2a, 2a, . . . connected through master station lines L2a, L2a, . . . .

The main entrance station 1a is equipped with a camera 10a, a power supply unit (as will be called the "entrance power supply unit") 11a, a distance decision unit (as will be called the "entrance distance decision unit") 12a, a level compensation unit (as will be called the "entrance level compensation unit") 13a, and an interface unit (as will be called the "entrance I/F") 14a.

In this main entrance station 1a, the camera 10a takes the image of a visitor having made a calling operation (although not detailed) at the main entrance or the image near the periphery of that entrance. The camera 10a is suitably exemplified by the various image pickup elements such as the CCD (Charge Coupled Devices) or the CMOS (Complementary Metal Oxide Semiconductor).

The entrance power supply unit 11a receives the DC power supply generated in the later-described power supply unit 30a of the controller 3a and fed through the entrance line L1a, and acts as an operating power supply to feed the electric power to the individual components of the main entrance station.

The entrance distance decision unit 12a detects the voltage drop of the DC power supply generated at the later-described power supply unit 30a of the controller 3a and fed through the entrance line L1a, and decides the distance of the line length of the entrance line L1a.

The entrance level compensation unit 13a compensates the level of the video signals taken by the camera 10a, in accordance with the distance of the line length of the entrance line L1a decided at the entrance distance decision unit 12a.

The entrance I/F 14a forms the power supply line from the entrance line L1a to the entrance power supply unit 11a and the entrance distance decision unit 12a, and the signal transmission line from entrance level compensation unit 13a to the entrance line L1a.

On the other hand, the first, second, . . . residential master stations 2a, 2a, . . . have similar constitutions, and each of them is equipped with a monitor 20a, a power supply unit (as will be called the "master station power supply unit") 21a, a distance decision unit (as will be called the "master station distance decision unit") 22a, a level compensation unit (as will be called the "master station level compensation unit") 23a, and an interface unit (as will be called the "master station I/F") 24a.

In each of the first, second, . . . residential master stations 2a, 2a, . . . , the monitor 20a displays the image (or the video signals) taken by the camera 10a of the main entrance station 1a. This monitor 20a is suitably exemplified by the various displays such as the LCD (Liquid Crystal Display) or the organic EL (Electro Luminescence) display.

The master station power supply unit 21a receives the DC power supply generated at the later-described power supply unit 30a of the controller 3a and fed through the individual master station lines L2a, L2a, . . . , and feeds the operating power to the individual components of the residential master station.

The master station distance decision unit 22a detects the voltage drop of the DC power supply generated at the later-described power supply unit 30a of the controller 3a and fed through the individual master station lines L2a, L2a, . . . , and decides the distances of the line lengths of the individual master station lines L2a, L2a, . . . .

The master station level compensation unit 23a compensates the levels of the video signals transmitted in the base band from the main entrance station 1a (or taken by the camera 10a) in accordance with the distances of the line lengths, as decided by the master station distance decision unit 22a, of the individual master station lines L2a, L2a, . . . , and sends out the compensated levels to the monitor 20a.

The master station I/F 24a forms the power supply line from each of the master station lines L2a, L2a, . . . to the master station power supply unit 21a and the master station distance decision unit 22a, and the signal transmission line from each of the master station lines L2a, L2a, . . . to the master station level compensation unit 23a.

Moreover, the controller 3a is equipped with the power supply unit (as will be called the "controller power supply unit") 30a, and two interface units (as will be individually called the "entrance side controller I/F" and the "master station side controller I/F") 31a and 32a.

In this controller 3a, the controller power supply unit 30a generates the DC power supply rectified/smoothed from the commercial power supply (AC 115V), feeds the operating power to the individual components of the controller 3a and the similar DC power supply to the individual components of the main entrance station 1a and the individual components of the first, second, . . . residential master stations 2a, 2a, . . . .

The entrance side controller I/F 31a forms the signal transmission line from the entrance line L1a to the master station side controller I/F 32a and the power supply line from the controller power supply unit 30a to the entrance line L1a.

The master station side controller I/F 32a forms the signal transmission line from the entrance side controller I/F 31a to each of the master station lines L2a, L2a, . . . and the power supply line from the controller power supply unit 30a to each of the master station lines L2a, L2a, . . . .

Here are described the specific operations of the collective housing intercom system thus constituted according to the first embodiment of the invention.

In FIG. 1, the controller power supply unit 30a of the controller 3a generates the DC power supply rectified/smoothed from the commercial power supply (AC 115V). This DC power supply not only acts as the operating power supply for the individual constitution parts of the controller 3a but also is fed to the entrance power supply unit 11a and the entrance distance decision unit 12a through the entrance side controller I/F 31a, the entrance line L1a and the entrance I/F 14a of the main entrance station 1a and to the master station power supply unit 21a and the master station distance decision unit 22a through the master station side controller I/F 32a, each of the master station lines L2a, L2a, . . . , and the master station I/F 24a of each of the first, second, . . . residential master stations 2a, 2a, . . . .

The entrance power supply unit 11a of the main entrance station 1a receives the DC power supply fed from the controller power supply unit 30a of the controller 3a, and can feed the power to each components of that main entrance station so that the DC power supply becomes an operating power supply. Here, the voltage level of the DC power supply received at the entrance power supply unit 11a is dropped according to the distance of the line length of the entrance line L1a and in comparison with the fed voltage level of the controller power supply unit 30a. When the video signals taken by the camera 10a are transmitted in the base band through the entrance line L1a, therefore, the level of the video signals is attenuated, as indicated in the characteristic diagram of FIG. 5. In order to prevent this, the entrance level compensation unit 13a can compensate the level of the video signals in accordance with the distance of the line length of the entrance line L1a decided by the entrance distance decision unit 12a. Here, FIG. 5 is a characteristic diagram for explaining the level compensations of video signals to be applied to the intercom systems in the individual embodiments (i.e., first to fourth embodiments) of the invention.

The master station power supply unit 21a of each of the first, second, ... residential master stations 2a, 2a, ... receives the DC power supply fed from the controller power supply unit 30a of the controller 3a, and can feed the electric power to each of the portions constituting that residential master station so that the DC power supply may be the operating power supply. The voltage level of the DC power supply received by the master station power supply unit 21a is lowered according to the distance of the line length of each of master station lines L2a, L2a, ... and in comparison with the fed voltage level of the controller power supply unit 30a. When the video signals taken by the camera 10a of the main entrance station 1a are transmitted in the base band through each of the master station lines L2a, L2a, ..., therefore, the level of the video signals is attenuated, as indicated in the characteristic diagram of FIG. 5. In order to prevent this, the master station level compensation unit 23a can compensate the level of the video signals in accordance with the distance of the line length of each of the master station lines L2a, L2a, ... decided by the master station distance decision unit 22a.

Here are described the operations to display the image taken by the camera 10a of the main entrance station 1a in the monitor 20a of the first residential master station 2a. A video signal S1a, i.e., the image taken by the camera 10a and processed into an electric signal is compensated in its level (as referred to FIG. 5) by the control of the entrance level compensation unit 13a and in accordance with the distance of the line length of the entrance line L1a decided at the entrance distance decision unit 12a. A video signal S2a, as generated by the aforementioned level compensation, is transmitted in the base band from the entrance level compensation unit 13a to the master station level compensation unit 23a through entrance I/F 14a and the entrance line L1a, through the entrance side controller I/F 31a and the master station side controller I/F 32a of the controller 3a, through the master station line L2a, and the master station I/F 24a of the first residential master station 2a. Here, the video signal S2a is superposed, when transmitted from the controller 3a to the first residential master station 2a, over the DC power supply fed from the controller power supply unit 30a through the master station line L2a.

The master station level compensation unit 23a of the first residential master station 2a compensates the level of the video signal S2a (as referred to FIG. 5) in accordance with the distance of the line length of the master station line L2a which is decided at the master station distance decision unit 22a. As a result, the image taken by the camera 10a of the main entrance station 1a can be displayed as an excellent image having not deterioration but excellent visibility in the monitor 20a irrespective of the distances of the individual lines of the entrance line L1a and the master station line L2a.

According to the first embodiment thus far described, the level compensating means for displaying the image taken by the camera 10a of the main entrance station 1a as the image having not deterioration but excellent visibility in the monitor 20a of the first residential master station 2a is exemplified by two kinds of different level compensating means: a level compensation resorting to the control of the entrance level compensation unit 13a and according to the distance of the line length of the entrance line L1a decided by the entrance distance decision unit 12a; and a level compensation resorting to the control of the master station level compensation unit 23a and according to the distance of the line length of the master station line L2a decided by the master station distance decision unit 22a. However, the invention should not be limited to this mode. For example, it is possible to apply at least one of the aforementioned two kinds of level compensating means.

Next, another mode of embodiment (as will be called the "second embodiment") having effects like those of the first embodiment is described with reference to the accompanying drawings.

Figure 2:
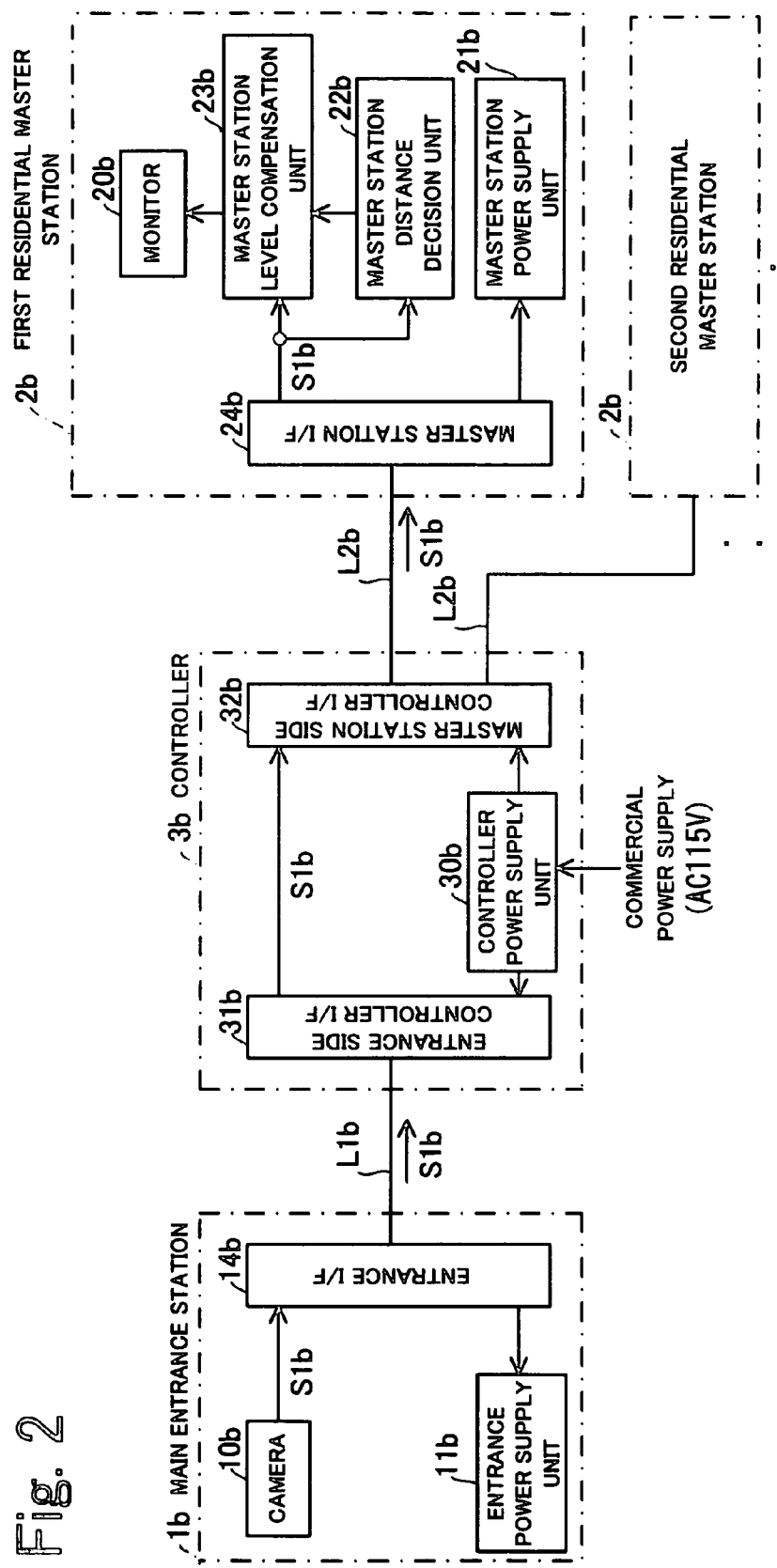
FIG. 2 is a block diagram showing a specific configuration of a collective housing intercom system according to a second embodiment of the invention.

FIG. 2 is a block diagram showing a specific configuration of a collective housing intercom system according to the second embodiment of the invention. Here, the individual components like those of the first embodiment are omitted in description by designating them by identical reference names and numerals.

The collective housing intercom system shown in FIG. 2 is provided with: a main entrance station 1b disposed at the entrance of a collective housing such as an apartment house; a plurality of residential master stations individually disposed in the houses of the collective housing, such as first, second ... residential master stations 2b, 2b, ... ; and a controller 3b for controlling the main entrance station 1b connected through an entrance line L1b and the first, second ... residential master stations 2b, 2b, ... connected through master station lines L2b, L2b, ....

The main entrance station 1b is provided with a camera 10b, an entrance power supply unit 11b and an entrance I/F 14b.

Moreover, the first, second ... residential master stations 2b, 2b, ... have similar constitutions, and each of them is equipped with a monitor 20b, a master station power supply unit 21b, a master station distance decision unit 22b, a master station level compensation unit 23b and a master station I/F 24b.

In each of the first, second ... residential master stations 2b, 2b, ..., the master station distance decision unit 22b detects the voltage drop of the DC component of the video signal taken by the camera 10b of the main entrance station 1b and transmitted in the base band, and decides the total distance of the line lengths of the entrance line L1b and the individual master station lines L2b, L2b, ....

The master station level compensation unit 23b compensates, in accordance with the total distance of the line lengths of the entrance line L1b and the individual master station lines L2b, L2b, ... decided at the master station distance decision unit 22b, the level of the video signal (taken by the camera 10b) transmitted in the base band from the main entrance station 1b and transmits to the monitor 20b. The master station distance decision unit 22b is connected between the master station level compensation unit 23b and the master station I/F 24b.

The master station I/F 24b forms the signal transmission line from each of the master station lines L2b, L2b, ... to the master station distance decision unit 22b and the master station level compensation unit 23b, and the power supply line from each of the master station lines L2b, L2b, ... to the master station power supply unit 21b.

Moreover, the controller 3b is equipped with a controller power supply unit 30b, an entrance side controller I/F 31b and a master station side controller I/F 32b.

Here are described the specific operations of the collective housing intercom system thus constituted according to the second embodiment of the invention.

In FIG. 2, the controller power supply unit 30b of the controller 3b generates the DC power supply rectified/smoothed from the commercial power supply (AC 115V). This DC power supply not only acts as the operating power supply for the individual constitution parts of the controller 3b but also is fed to the entrance power supply unit 11b through the entrance side controller I/F 31b, the entrance line L1b and the entrance I/F 14b of the main entrance station 1b and to the master station power supply unit 21b through the master station side controller I/F 32b, each of the master station lines L2b, L2b, . . . , and the master station I/F 24b of each of the first, second, . . . residential master stations 2b, 2b, . . . .

The entrance power supply unit 11b of the main entrance station 1b receives the DC power supply fed from the controller power supply unit 30b of the controller 3b, and can feed the power to each components of that main entrance station so that the DC power supply becomes an operating power supply.

The master station power supply unit 21b of each of the first, second, . . . residential master stations 2b, 2b, . . . receives the DC power supply fed from the controller power supply unit 30b of the controller 3b, and can feed the electric power to each of the portions constituting that residential master station so that the DC power supply may be the operating power supply.

Here are described the operations to display the image taken by the camera 10b of the main entrance station 1b in the monitor 20b of the first residential master station 2b. A video signal S1b, i.e., the image taken by the camera 10b was processed into an electric signal is transmitted in the base band to the master station distance decision unit 22b and the master station level compensation unit 23b through entrance I/F 14b and the entrance line L1b, through the entrance side controller I/F 31b and the master station side controller I/F 32b of the controller 3b, through the master station line L2b, and the master station I/F 24b of the first residential master station 2b. Here, the video signal S1b is superposed, when transmitted from the controller 3b to the first residential master station 2b, over the DC power supply fed from the controller power supply unit 30b through the master station line L2b.

The master station distance decision unit 22b of the residential master station 2b detects the voltage drop of the DC component of the video signal S1b transmitted in the base band, and decides the total distance of the line lengths of the entrance line L1b and the master station line L2b on the basis of the detection result. The master station level compensation unit 23b compensates the level of the video signal S1b (as referred to FIG. 5) in accordance with the distance of the line length which is decided at the master station distance decision unit 22b. As a result, the image taken by the camera 10b of the main entrance station 1b can be displayed as an excellent image having not deterioration but excellent visibility in the monitor 20b irrespective of the distances of the individual line lengths of the entrance line L1b and the master station line L2b.

According to the second embodiment thus far described, the level compensating means for displaying the image taken by the camera 10b of the main entrance station 1b as the image having not deterioration but excellent visibility in the monitor 20b of the residential master station 2b is exemplified by level compensating means resorting to the control of the master station level compensation unit 23b and according to the total distance of the line lengths of the entrance line L1a and the master station line L2b decided by the master station distance decision unit 22b. However, the invention should not be limited to this mode. Of the two kinds of level compensating means applied in the aforementioned first embodiment, for example, the level compensating means (i.e., the entrance distance decision unit 12a and the entrance level compensation unit 13a) belonging to the main entrance station 1a can be disposed at the main entrance station 1b.

Next, another mode of embodiment (as will be called the "third embodiment") having effects like those of the first and second embodiments is described with reference to the accompanying drawings.

Figure 3:
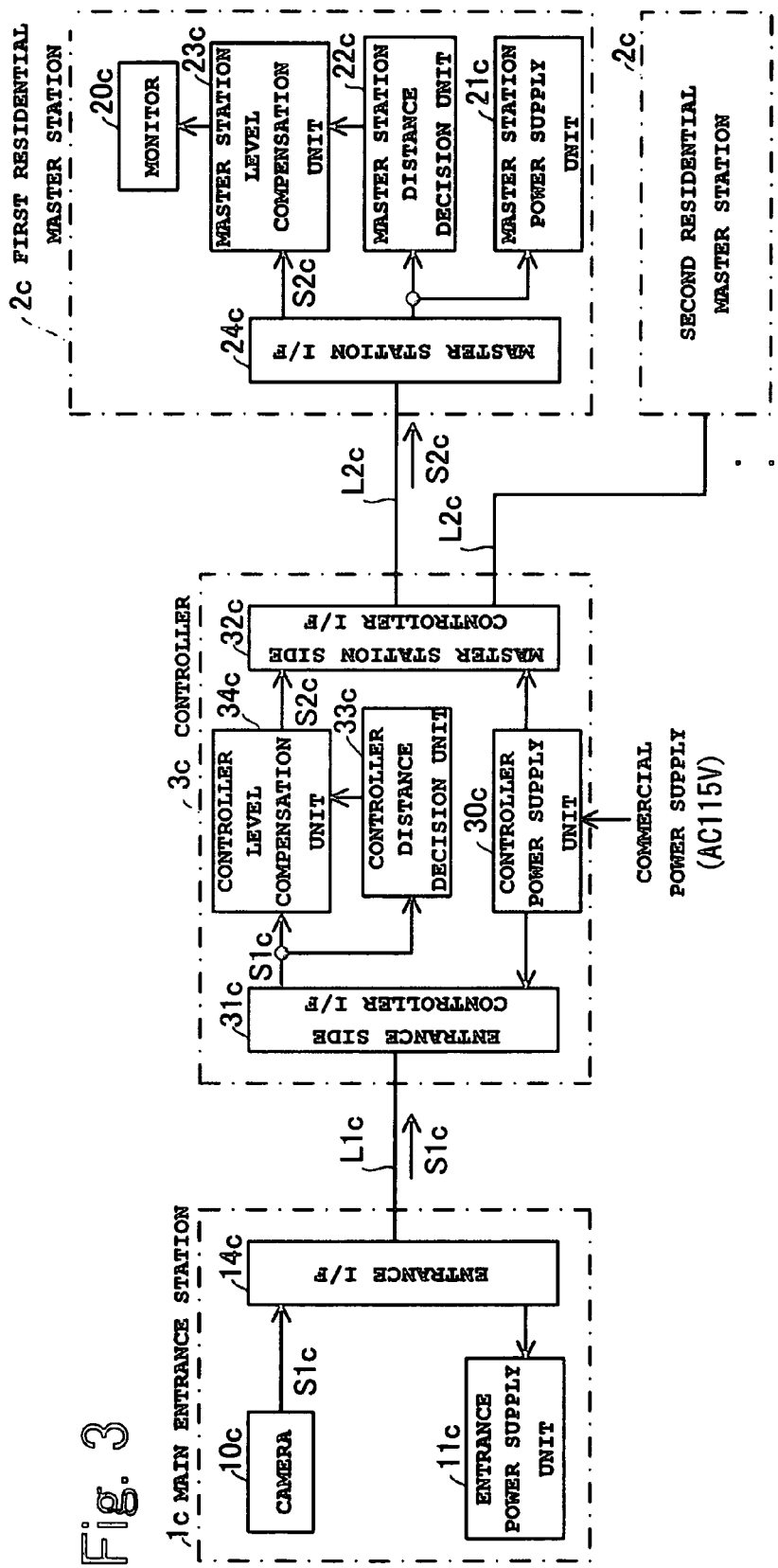
FIG. 3 is a block diagram showing a specific configuration of a collective housing intercom system according to a third embodiment of the invention.

FIG. 3 is a block diagram showing a specific configuration of a collective housing intercom system according to the third embodiment of the invention. Here, the individual components like those of the first and second embodiments are omitted in description by designating them by identical reference names and numerals.

The collective housing intercom system shown in FIG. 3 is provided with: a main entrance station 1c disposed at the entrance of a collective housing such as an apartment house; a plurality of residential master stations individually disposed in the houses of the collective housing, such as first, second . . . residential master stations 2c, 2c, . . . ; and a controller 3c for controlling the main entrance station 1c connected through an entrance line L1c and the first, second . . . residential master stations 2c, 2c, . . . connected through master station lines L2c, L2c, . . . .

The main entrance station 1c is provided with a camera 10c, an entrance power supply unit 11c and an entrance I/F 14c.

Moreover, the first, second . . . residential master stations 2c, 2c, . . . have similar constitutions, and each of them is equipped with components like those of the first, second . . . residential master station 2a, 2a, . . . according to the first embodiment, such as a monitor 20c, a master station power supply unit 21c, a master station distance decision unit 22c, a master station level compensation unit 23c and a master station I/F 24c.

Moreover, the controller 3c is equipped with a controller power supply unit 30c, an entrance side controller I/F 31c, a master station side controller I/F 32c, a distance decision unit (as will be called the "controller distance decision unit") 33c, and a level compensation unit (as will be called the "controller level compensation unit") 34c.

In this controller 3c, the controller distance decision unit 33c detects the voltage drop of the DC component of the video signal taken by the camera 10c of the main entrance station 1c and transmitted in the base band, and decides the distance of the line length of the entrance line L1c.

The controller level compensation unit 34c compensates, in accordance with the distance of the line length of the entrance line L1c decided at the controller distance decision unit 33c, the level of the video signal (taken by the camera 10b) transmitted in the base band from the main entrance station 1c. The controller distance decision unit 33c is connected between the controller level compensation unit 34c and the entrance side controller I/F 31c.

Here are described the specific operations of the collective housing intercom system thus constituted according to the third embodiment of the invention.

In FIG. 3, the controller power supply unit 30c of the controller 3c generates the DC power supply rectified/smoothed from the commercial power supply (AC 115V). This DC power supply not only acts as the operating power supply for the individual constitution parts of the controller 3c but also is fed to the entrance power supply unit 11c through the entrance side controller I/F 31c, the entrance line L1c and the entrance I/F 14c of the main entrance station 1c and to the master station power supply unit 21c and the master station distance decision unit 22c through the master station side controller I/F 32c, each of the master station lines L2c, L2c, . . . , and the master station I/F 24c of each of the first, second, . . . residential master stations 2c, 2c, . . . .

The entrance power supply unit 11c of the main entrance station 1c receives the DC power supply fed from the controller power supply unit 30c of the controller 3c, and can feed the power to each components of that main entrance station so that the DC power supply becomes an operating power supply.

The master station power supply unit 21c of each of the first, second, ... residential master stations 2c, 2c, ... receives the DC power supply fed from the controller power supply unit 30c of the controller 3c, and can feed the electric power to each of the portions constituting that residential master station so that the DC power supply may be the operating power supply. The voltage level of the DC power supply received by the master station power supply unit 21c is lowered according to the distance of the line length of each of master station lines L2c, L2c, ... and in comparison with the fed voltage level of the controller power supply unit 30c. When the video signals taken by the camera 10c of the main entrance station 1c are transmitted in the base band through each of the master station lines L2c, L2c, ..., therefore, the level of the video signals is attenuated, as indicated in the characteristic diagram of FIG. 5. In order to prevent this, the master station level compensation unit 23c can compensate the level of the video signals in accordance with the distance of the line length of each of the master station lines L2c, L2c, ... decided by the master station distance decision unit 22c, as in the first embodiment.

Here are described the operations to display the image taken by the camera 10c of the main entrance station 1c in the monitor 20c of the first residential master station 2c. A video signal S1c, i.e., the image taken by the camera 10c and processed into an electric signal is transmitted in the base band to the controller distance decision unit 33c and the controller level compensation unit 34c through entrance I/F 14c and the entrance line L1c, and through the entrance side controller I/F 31c of the controller 3c.

The controller distance decision unit 33c of the controller 3c detects the voltage drop of the DC component of the video signal S1c transmitted in the base band, and, based on the detection result, decides the distance of the line length of entrance line L1c. On the other hand, the controller level compensation unit 34c generates, in accordance with the distance of the line length decided by the controller distance decision unit 33c, a video signal S2c which is compensated (as referred to FIG. 5) in the level of the video signal S1c. That video signal S2c is transmitted in the base band from the controller level compensation unit 34c to the master station level compensation unit 23c through the master station side controller I/F 32c, the master station line L2c and the master station I/F 24c of the first residential master station 2c. Here, the video signal S2c is superposed, when transmitted from the controller 3c to the first residential master station 2c, over the DC power supply fed from the controller power supply unit 30c through the master station line L2c.

The master station level compensation unit 23c of the first residential master station 2c compensates the level of the video signal S2c (as referred to FIG. 5) in accordance with the distance of the line length of the master station line L2c which is decided at the master station distance decision unit 22c. As a result, the image taken by the camera 10c of the main entrance station 1c can be displayed as an excellent image having not deterioration but excellent visibility in the monitor 20c irrespective of the distances of the individual line lengths of the entrance line L1c and the master station line L2c.

According to the third embodiment thus far described, the level compensating means for displaying the image taken by the camera 10c of the main entrance station 1c as the image having not deterioration but excellent visibility in the monitor 20c of the first residential master station 2c is exemplified by level compensating means resorting to the control of the master station level compensation unit 23c and according to the distance of the line length of the master station line L2c decided by the master station distance decision unit 22c. However, the invention should not be limited to this mode. As has been applied to the second embodiment, for example, the level compensating means resorting to the control of the master station level compensation unit 23b and according to the distance of the line length of the master station line L2b decided by the master station distance decision unit 22b can be applied to each of the first, second ... residential master stations 2c, 2c, ....

Next, another mode of embodiment (as will be called the "fourth embodiment") having effects like those of the first to third embodiments is described with reference to the accompanying drawings.

Figure 4:
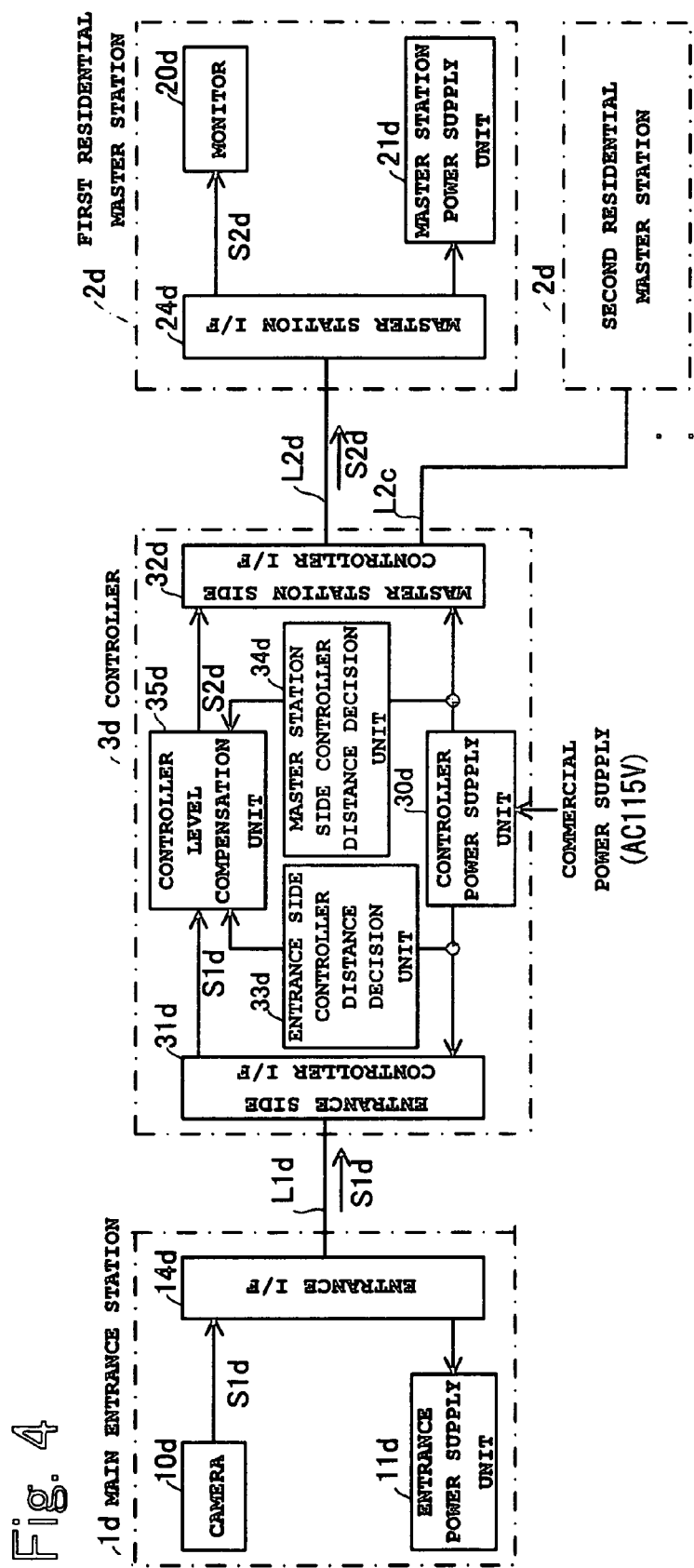
FIG. 4 is a block diagram showing a specific configuration of a collective housing intercom system according to a fourth embodiment of the invention.

FIG. 4 is a block diagram showing a specific configuration of a collective housing intercom system according to the fourth embodiment of the invention. Here, the individual components like those of the first to third embodiments are omitted in description by designating them by identical reference names and numerals.

The collective housing intercom system shown in FIG. 4 is provided with: a main entrance station 1d disposed at the entrance of a collective housing such as an apartment house; a plurality of residential master stations individually disposed in the houses of the collective housing, such as first, second ... residential master stations 2d, 2d, ... ; and a controller 3d for controlling the main entrance station 1d connected through an entrance line L1d and the first, second ... residential master stations 2d, 2d, ... connected through master station lines L2d, L2d, ....

The main entrance station 1d is provided with a camera 10d, an entrance power supply unit 11d and an entrance I/F 14d.

Moreover, the first, second ... residential master stations 2d, 2d, ... have similar constitutions, and each of them is equipped with a monitor 20d, a master station power supply unit 21d, and a master station I/F 24d.

Moreover, the controller 3d is equipped with a controller power supply unit 30d, an entrance side controller I/F 31d, a master station side controller I/F 32d, two distance decision units (as will be called the "entrance side controller distance decision unit" and the "master station side controller distance decision unit") 33d and 34d, and a controller level compensation unit 35d.

In this controller 3d, the entrance side controller distance decision unit 33d detects the current flow of the DC power supply fed from the controller power supply unit 30d to the main entrance station 1d, and decides the distance of the line length of the entrance line L1d. The entrance side controller distance decision unit 33d is connected between the controller power supply unit 30d and the entrance side controller I/F 31d.

The master station side controller distance decision unit 34d detects the current flow of the DC power supply fed from the controller power supply unit 30d to each of the residential master stations 2d, 2d, ..., and decides the distances of the line lengths of the individual master station lines L2b, L2b, .... This master station side controller distance decision unit 34d is connected between the controller power supply unit 30d and the master station side controller I/F 32d.

The controller level compensation unit 35d compensates the level of the video signal (picked-up by the camera 10d) which is transmitted in the base band from the main entrance station 1d, in accordance with the distance of the line length of the entrance line L1d decided at the entrance side controller distance decision unit 33d and the distance of the line length of each of the master station lines L2d, L2d, . . . decided at the master station side controller distance decision unit 34d.

Here are described the specific operations of the collective housing intercom system thus constituted according to the fourth embodiment of the invention.

In FIG. 4, the controller power supply unit 30d of the controller 3d generates the DC power supply rectified/smoothed from the commercial power supply (AC 115V). This DC power supply not only acts as the operating power supply for the individual constitution parts of the controller 3d but also is fed to the entrance power supply unit 11d through the entrance side controller I/F 31d, the entrance line L1d and the entrance I/F 14d of the main entrance station 1d and to the master station power supply unit 21d through the master station side controller I/F 32d, each of the master station lines L2d, L2d, . . . , and the master station I/F 24d of each of the first, second, . . . residential master stations 2d, 2d, . . . .

Here, the entrance side controller distance decision unit 33d of the controller 3d decides, on the basis of the current flow of the DC power supply fed from the controller power supply unit 30d to the main entrance station 1d, the distance of the line length of the entrance line L1d. On the other hand, the master station side controller distance decision unit 34d decides, on the basis of the current flow of the DC power supply fed from the controller power supply unit 30d to each of the first, second . . . residential master stations 2d, 2d, . . . , the distance of the line length of each of the master station lines L2d, L2d, . . . .

The entrance power supply unit 11d of the main entrance station 1d receives the DC power supply fed from the controller power supply unit 30d of the controller 3d, and can feed the power to each components of that main entrance station so that the DC power supply becomes an operating power supply.

The master station power supply unit 21d of each of the first, second, . . . residential master stations 2d, 2d, . . . receives the DC power supply fed from the controller power supply unit 30d of the controller 3d, and can feed the electric power to each of the portions constituting that residential master station so that the DC power supply may be the operating power supply.

Here are described the operations to display the image taken by the camera 10d of the main entrance station 1d in the monitor 20d of the first residential master station 2d. A video signal S1d, i.e., the image taken by the camera 10d and processed into an electric signal is transmitted in the base band to the controller level compensation unit 35d through entrance I/F 14d and the entrance line L1d, and through the entrance side controller I/F 31d of the controller 3d.

The controller level compensation unit 35d of the controller 3d generates, in accordance with the distance of the line length of the entrance line L1d decided by the entrance side controller distance decision unit 33d and the distance of the line length of the master station line L2d decided by the master station side controller distance decision unit 34d, a video signal S2d which is compensated (as referred to FIG. 5) in the level of the video signal S1d transmitted in the base band. That video signal S2d is transmitted from the controller level compensation unit 35d to the monitor 20d through the master station side controller I/F 32d, the master station line L2d and the master station I/F 24d of the first residential master station 2d. As a result, the image taken by the camera 10d of the main entrance station 1d can be displayed as an image having not deterioration but excellent visibility in the monitor 20d irrespective of the distances of the line lengths of the entrance line L1d and the master station line L2d. Here, the video signal S2d is superposed, when transmitted from the controller 3d to the first residential master station 2d, over the DC power supply fed from the controller power supply unit 30d through the master station line L2d.

According to the fourth embodiment thus far described, the level compensating means for displaying the image taken by the camera 10d of the main entrance station 1d as the image having not deterioration but excellent visibility in the monitor 20d of the first residential master station 2d is exemplified by two kinds of different distance deciding units such as the entrance side controller distance decision unit 33d and the master station side controller distance decision unit 34d of the controller 3d, so that the level compensations according to the distances of the individual line lengths of the entrance line L1c and the master station line L2d which are decided by those distance decision units 33d and 34d. However, the invention should not be limited to this mode. For example, it is possible to apply at least one of the aforementioned two kinds of distance decision units 33d and 34d. In case the controller 3d is equipped with only the entrance side controller distance decision unit 33d, it is preferred that each of the first, second . . . residential master stations 2d, 2d, . . . is equipped with the master station distance decision units 22a and 22b and the master station level compensation units 23a and 23b, as applied to the foregoing first embodiment or second embodiment. In case the controller 3d is equipped with only the master station side controller distance decision unit 34d, it is preferred that the main entrance station 1d is equipped with the entrance distance decision unit 12a and the entrance level compensation unit 13a, as applied to the foregoing first embodiment.

The collective housing intercom system of the invention has been described in connection with specific modes of embodiment, to which the invention should not be limited. It goes without saying that the present invention can adopt any of collective housing intercom system of the known constitution such as one having a management room master station installed in a management room so long as the effects of the invention are retained. Moreover, the connections between the controllers 3a, 3b, 3c and 3d and the first, second . . . individual residential master stations 2a, 2a, . . . , 2b, 2b, . . . , 2c, 2c, . . . , and 2d, 2d, . . . should not be limited to the individual ones through the master station lines L2a, L2a, . . . , L2b, L2b, . . . , L2c, L2c, . . . , and L2d, L2d, . . . . For example, the single master station line can bus-connect the first, second . . . individual residential master stations 2a, 2a, . . . , 2b, 2b, . . . , 2c, 2c, . . . , and 2d, 2d, . . . .

The invention claimed is:

1. A collective housing intercom system comprising: main entrance station having a camera disposed at the entrance of a collective housing; residential master stations disposed in the individual residences of said collective housing and having monitors for displaying the image taken by the camera of said main entrance station; and a controller for controlling said main entrance station connected through an entrance line and said residential master stations connected through master station lines, wherein each of said residential master stations includes a distance decision unit for detecting the voltage drop of a DC power supply fed from said controller to decide the distance of the line length of said master station lines, and a level compensation unit for compensating the level of a video signal transmitted from said main entrance station, in accordance with the distance decided by said distance decision unit.

2. A collective housing intercom system comprising: main entrance station having a camera disposed at the entrance of a collective housing; residential master stations disposed in the individual residences of said collective housing and having monitors for displaying the image taken by the camera of said main entrance station; and a controller for controlling said main entrance station connected through an entrance line and said residential master stations connected through master station lines, wherein said main entrance station includes a distance decision unit for detecting the voltage drop of a DC power supply fed from said controller to decide the distance of the line length of said entrance line, and a level compensation unit for compensating the level of a video signal taken by said camera, in accordance with the distance decided by said distance decision unit.

3. A collective housing intercom system comprising: main entrance station having a camera disposed at the entrance of a collective housing; residential master stations disposed in the individual residences of said collective housing and having monitors for displaying the image taken by the camera of said main entrance station; and a controller for controlling said main entrance station connected through an entrance line and said residential master stations connected through master station lines, wherein each of said residential master stations includes a distance decision unit for detecting the voltage drop of the DC component of a video signal transmitted in a base band from said main entrance station to decide the total distance of the line lengths of said entrance line and said master station lines, and a level compensation unit for compensating the level of said video signal, in accordance with the distance decided by said distance decision unit.

4. A collective housing intercom system comprising: main entrance station having a camera disposed at the entrance of a collective housing; residential master stations disposed in the individual residences of said collective housing and having monitors for displaying the image taken by the camera of said main entrance station; and a controller for controlling said main entrance station connected through an entrance line and said residential master stations connected through master station lines, wherein said controller includes a distance decision unit for detecting the voltage drop of the DC component of a video signal transmitted in a base band from said main entrance station to decide the distance of the line length of said entrance line, and a level compensation unit for compensating the level of said video signal, in accordance with the distance decided by said distance decision unit.

5. A collective housing intercom system comprising: main entrance station having a camera disposed at the entrance of a collective housing; residential master stations disposed in the individual residences of said collective housing and having monitors for displaying the image taken by the camera of said main entrance station; and a controller for controlling said main entrance station connected through an entrance line and said residential master stations connected through master station lines, wherein said controller includes a distance decision unit for detecting the current flow of the DC power supply to be fed to said main entrance station to decide the distance of the line length of said entrance line, and a level compensation unit for compensating the level of the video signal transmitted from said main entrance station, in accordance with the distance decided by said distance decision unit.

6. A collective housing intercom system comprising: main entrance station having a camera disposed at the entrance of a collective housing; residential master stations disposed in the individual residences of said collective housing and having monitors for displaying the image taken by the camera of said main entrance station; and a controller for controlling said main entrance station connected through an entrance line and said residential master stations connected through master station lines, wherein said controller includes a distance decision unit for detecting the current flow of the DC power supply to be fed to said residential master station to decide the distance of the line length of said master station line, and a level compensation unit for compensating the level of the video signal transmitted from said main entrance station, in accordance with the distance decided by said distance decision unit.

* * * * *